United States Patent
Chen et al.

(10) Patent No.: US 9,980,248 B2
(45) Date of Patent: May 22, 2018

(54) METHOD FOR DEVICE TO ACCESS NETWORK, ACCESS POINT, NETWORK ACCESS DEVICE, AND SYSTEM

(71) Applicant: Huawei Device (Dongguan) Co., Ltd., Dongguan (CN)

(72) Inventors: Ji Chen, Shenzhen (CN); Zhiming Ding, Shenzhen (CN); Ping Fang, Shenzhen (CN); Yi Luo, Shenzhen (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 0 days. days.

(21) Appl. No.: 14/142,549

(22) Filed: Dec. 27, 2013

(65) Prior Publication Data

US 2014/0112237 A1    Apr. 24, 2014

Related U.S. Application Data

(63) Continuation of application No. PCT/CN2013/070775, filed on Jan. 21, 2013.

(30) Foreign Application Priority Data

Jan. 21, 2012 (CN) .......................... 2012 1 0019763

(51) Int. Cl.
*H04W 72/00* (2009.01)
*H04W 72/10* (2009.01)
*H04W 48/12* (2009.01)

(52) U.S. Cl.
CPC ......... *H04W 72/005* (2013.01); *H04W 48/12* (2013.01); *H04W 72/10* (2013.01)

(58) Field of Classification Search
CPC ......... H04L 61/60; H04L 45/00; H04L 45/02; H04L 45/74; H04W 76/02; H04W 8/26
See application file for complete search history.

(56) References Cited

U.S. PATENT DOCUMENTS

| 2005/0002346 A1 | 1/2005 | Bichot |
| 2005/0036510 A1 | 2/2005 | Sarikaya et al. |

(Continued)

FOREIGN PATENT DOCUMENTS

| CN | 1581831 A | 2/2005 |
| CN | 1600037 A | 3/2005 |

(Continued)

OTHER PUBLICATIONS

"IEE Standard for Information technology—Telecommunications and information exchange between systems—Local and metropolitan area networks—Specific requirements, Part 11: Wireless LAN Medium Access Control (MAC) and Physical Layer (PHY) Specifications," IEEE Std. 802.11, pp. i-1184, IEE Computer Society, Institute of Electrical and Electronics Engineers, New York, New York (Jun. 12, 2007).

(Continued)

*Primary Examiner* — Ricky Ngo
*Assistant Examiner* — Stephen Steiner
(74) *Attorney, Agent, or Firm* — Leydig, Voit & Mayer Ltd.

(57) ABSTRACT

Embodiments of the present invention disclose a method for a device to access a network, an access point, a network access device, and a system. The method includes: generating, by an access point, a broadcast frame, where the broadcast frame includes feature information of a network access device; and the feature information is used for indicating a feature of the network access device; and broadcasting, by the access point, the broadcast frame, so that a specific network access device initiates a network access procedure to the access point; where the specific network access device is a network access device which receives the broadcast frame and has the feature indicated by the feature information. By adopting the present invention, (Continued)

contention collisions among network access devices can be reduced through a manner of accessing a network in batches.

12 Claims, 3 Drawing Sheets

(56) References Cited

U.S. PATENT DOCUMENTS

| | | |
|---|---|---|
| 2006/0193315 A1 | 8/2006 | Sinivaara et al. |
| 2006/0285521 A1 | 12/2006 | Steudle |
| 2007/0015523 A1 | 1/2007 | Prakash et al. |
| 2007/0032219 A1 | 2/2007 | Rudolf et al. |
| 2007/0077936 A1 | 4/2007 | Tomisawa et al. |
| 2007/0207788 A1 | 9/2007 | Phan et al. |
| 2008/0146253 A1 | 6/2008 | Wentink |
| 2008/0220769 A1 | 9/2008 | Qi et al. |
| 2009/0061851 A1 | 3/2009 | Kitazoe |
| 2010/0189021 A1* | 7/2010 | He .................... H04W 52/00 370/311 |
| 2010/0204827 A1 | 8/2010 | Michenet |
| 2011/0069651 A1 | 3/2011 | Kangude |
| 2011/0305216 A1* | 12/2011 | Seok .................... 370/329 |
| 2012/0069798 A1 | 3/2012 | Vitthaladevuni et al. |
| 2012/0294146 A1 | 11/2012 | Wu |
| 2013/0080644 A1 | 3/2013 | Kimura |
| 2013/0094484 A1 | 4/2013 | Kneckt et al. |
| 2013/0182652 A1* | 7/2013 | Tong et al. .................... 370/329 |
| 2013/0208667 A1 | 8/2013 | Merlin et al. |
| 2013/0217359 A1 | 8/2013 | Cherian et al. |
| 2013/0294261 A1 | 11/2013 | Ghosh et al. |
| 2014/0105116 A1 | 4/2014 | Ding et al. |
| 2014/0219143 A1 | 8/2014 | He et al. |
| 2014/0233535 A1 | 8/2014 | Zhao et al. |
| 2014/0376536 A1* | 12/2014 | Ding et al. .................... 370/338 |

FOREIGN PATENT DOCUMENTS

| | | |
|---|---|---|
| CN | 1871816 A | 11/2006 |
| CN | 101185359 A | 5/2008 |
| CN | 101300882 A | 11/2008 |
| CN | 101395949 A | 3/2009 |
| CN | 101453409 A | 6/2009 |
| CN | 101640942 A | 2/2010 |
| CN | 101715190 A | 5/2010 |
| CN | 102036364 A | 4/2011 |
| CN | 102118801 A | 7/2011 |
| EP | 2373110 A2 | 10/2011 |
| JP | 2009232112 A | 10/2009 |
| JP | 2010093612 A | 4/2010 |
| JP | 2011019104 A | 1/2011 |
| JP | 2013074330 A | 4/2013 |
| JP | 2013528985 A | 7/2013 |
| JP | 2013537781 A | 10/2013 |
| WO | WO 2004057897 A1 | 7/2004 |
| WO | 2007051910 A1 | 5/2007 |
| WO | 2007052888 A2 | 5/2007 |
| WO | WO 2009024925 A2 * | 2/2009 ........ H04W 52/0216 |
| WO | WO2009024925 A2 * | 2/2009 ........ H04W 52/0216 |
| WO | 2009113798 A2 | 9/2009 |
| WO | WO 2011127710 A1 | 10/2011 |
| WO | 2012024331 A1 | 2/2012 |

OTHER PUBLICATIONS

"UE RLF report," 3GPP TSG RAN WG2, Meeting #69, San Francisco, California, R2-101265, 3$^{rd}$ Generation Partnership Project, Valbonne, France (Feb. 22-26, 2010).

"HS-DPCCH Timing in Multiflow HSDPA," 3GPP TSG RAN WG1 Meeting #68, Dresden, Germany, pp. 1-6, R1-120600, 3rd Generation Partnership Project, Valbonne, France (Feb. 6-10, 2012).

"Further analysis of HS-DPCCH timing for MF-HSDPA," 3GPP TSG RAN WG1 Meeting #68, Dresden, Germany, R1-120683, 3rd Generation Partnership Project, Valbonne, France (Feb. 6-10, 2012).

"HS-DPCCH Feedback Design for MF-Tx," 3GPP TSG-RAN WG1 Meeting #68, Dresden, Germany, pp. 1-5, R1-120692, 3rd Generation Partnership Project, Valbonne, France (Feb. 6-10, 2012).

"Timing analysis of HS-DPCCH transmission for HSDPA MF-TX," 3GPP TSG RAN WG1 Meeting #68, Dresden, Germany, R1-120792, 3rd Generation Partnership Project, Valbonne, France (Feb. 6-10, 2012).

"3rd Generation Partnership Project; Technical Specification Group Radio Access Network; Physical channels and mapping of transport channels onto physical channels (FDD) (Release 11)," 3GPP TS 25.211 V11.0.0, pp. 1-60, 3rd Generation Partnership Project, Valbonne, France (Dec. 2011).

"3rd Generation Partnership Project; Technical Specification Group Radio Access Network; Radio Resource Control (RRC); Protocol specification (Release 11)," 3GPP TS 25.331 V11.1.0, pp. 1-1911, 3rd Generation Partnership Project, Valbonne, France (Mar. 2012).

Park, "Station Group Management for 802.11ah," IEEE 802.11-11/0762r0, Slides 1-9, Institute of Electrical and Electronics Engineers, New York, New York (May 10, 2011).

Liu et al., "DCF Enhancements for Large Number of STAs," IEEE 802.11-11/1255r0, Slides 1-11, Institute of Electrical and Electronics Engineers, New York, New York, (Sep. 15, 2011).

* cited by examiner

METHOD FOR DEVICE TO ACCESS NETWORK, ACCESS POINT, NETWORK ACCESS DEVICE, AND SYSTEM

CROSS-REFERENCE TO RELATED APPLICATIONS

This application is a continuation of International Patent Application No. PCT/CN2013/070775, filed on Jan. 21, 2013, which claims priority to Chinese Patent Application No. 201210019763.1, filed on Jan. 21, 2012, both of which are hereby incorporated by reference in their entireties.

TECHNICAL FIELD

The present invention relates to the field of wireless communications, and in particular, to a method for a device to access a network, an access point, a network access device, and a system.

BACKGROUND

Wireless fidelity (Wireless Fidelity, WiFi) is a technique which enables a personal computer, a hand-held device (such as a PDA or a cell phone), and other terminals to be interconnected in a wireless manner, so as to improve interoperability among wireless network products based on IEEE 802.11 standards.

The most basic network structure of the WiFi includes an access point (Access Point, AP) and several stations (Station, STA) supporting IEEE 802.11 protocols, and the AP provides the STAs with an access service. A wireless signal is used as an interaction medium between the AP and the STAs. The AP periodically broadcasts a beacon (Beacon) message to surrounding areas, and the message includes a lot of information, such as the name of a network which the AP belongs to, a MAC address of the AP, and a period of the Beacon. A STA may obtain information about the AP and the network of the AP through the Beacon, or may obtain a probe response reply from the AP by broadcasting a probe request message to the AP, so as to obtain information about the AP and the network of the AP. When the STA broadcasts the probe request, the STA may specify a dedicated AP (by specifying a dedicated BSSID) to receive the probe request, or may broadcast the probe request to all APs (by specifying a wildcard BSSID). If the STA specifies a dedicated AP to receive the probe request, it is possible that it is the first message initiated by the STA for applying for network access; and if the STA broadcasts the probe request to all APs, it means that the STA only queries for currently available AP resource information.

If the STA wants to communicate with the AP, the STA first finds a network through a Beacon or a probe request/probe response procedure, and then turns into a state in which the STA is associated with the AP through an access procedure. Then the AP and the STA can communicate with each other. The access procedure refers to a series of procedures initiated by the STA to interact with the AP after the STA finds the network. After the interaction procedures are successfully completed, the STA and the AP are in an associated state.

Wireless transmission between the AP and the STAs is performed through a specific frequency, which means that data transmission can be implemented between only one STA and the AP on a wireless medium at the same moment. Therefore, when multiple STAs send access requests to the AP at the same moment, collisions may occur.

Therefore, in order to prevent the collisions, it is necessary to have a collision avoidance mechanism. The collision avoidance mechanism used in the 802.11 standards is called CSMA/CA (carrier sense multiple access with collision avoidance). Contention principles of the CSMA/CA are as follows: 1. before each STA attempts to send a message, the STA first monitors whether a wireless channel is idle; 2. if the STA confirms that the radio channel is idle, the STA randomly generates backoff time within a determined backoff window range; 3. since the backoff time of each STA is random and independent from each other, the backoff time is probably different; 4. the STA continuously senses the channel, and if the channel is idle, after a backoff time unit, the STA decreases a value of the backoff time progressively; and if the channel is busy, the STA pauses decreasing the backoff time, and after the STA confirms that the channel is idle the next time, the STA proceeds to decrease the backoff time value; 5. after the backoff time of the STA is decreased to 0, the STA sends a message; 6. if the STA can receive corresponding confirmation information after sending the massage, it means that at this time, only the STA has the backoff time decreased to 0, obtains a resource in the contention, and succeeds in sending; otherwise, it means that more than one STA has the backoff time decreased to 0 at the same time, so that collisions are caused, and in this situation, the STAs have to contend again.

The random backoff time is generated within a certain range, and the range is called a backoff window. Current technical standards have distinct limits on the size of the backoff window. An upper limit value of the smallest backoff window varies with different physical layer specifications and different requirements on service flow QoS, with 3 (voice data) being the smallest and 63 being the greatest. An upper limit of the greatest backoff window is 1023. In the existing technical solution, all STAs are equal and may contend at the same moment. The STA (or the STAs) having the smallest backoff window will have the backoff time value decreased to 0 at the earliest time, thereby attempting to send a message. If the STA can receive returned confirmation information, it means that the STA succeeds in sending; otherwise, it means that the collisions occur, so the STA has to contend again.

As in current standards, one AP supports only 2007 STAs, the contention strategy not yet has an eminent problem. However, in 802.11ah, the number of STAs supported by one AP is expanded to more than 6000. When the large number of STAs contend for network access at the same time, according to the above backoff window strategy, the situation increases greatly that two or more smallest backoff windows being the same are generated. In this situation, the STAs have the backoff windows decreased to 0 at the same time, and then attempt to send messages at the same moment, which will definitely cause a lot of collisions, thereby affecting overall STA access efficiency.

SUMMARY

Technical problems to be solved by embodiments of the present invention are to provide a method for a device to access a network, an access point, a network access device, and a system, capable of indicating, through feature information, a network access device which can access a network, so as to reduce contention collisions among access stations.

In order to solve the above technical problems, in one aspect, an embodiment of the present invention provides a method for a device to access a network, the method including:

generating, by an access point, a broadcast frame, where the broadcast frame includes feature information of a network access device; and the feature information is used for indicating a feature of the network access device; and broadcasting, by the access point, the broadcast frame, so that a specific network access device initiates a network access procedure to the access point; where the specific network access device is a network access device which receives the broadcast frame and has the feature indicated by the feature information.

In another aspect, an embodiment of the present invention also provides a method for a device to access a network, the method including:

receiving, by a network access device, a broadcast frame broadcast by an access point, where the broadcast frame includes feature information of a network access device; and the feature information is used for indicating a feature of the network access device; and determining, by the network access device, whether the network access device has the feature indicated by the feature information, and if the network access device has the feature indicated by the feature information, initiating a network access procedure to the access point.

In further another aspect, an embodiment of the present invention also provides an access point, including:

a generating module, configured to generate a broadcast frame, where the broadcast frame includes feature information of a network access device; and the feature information is used for indicating a feature of the network access device; and a broadcasting module, configured to broadcast the broadcast frame, so that a specific network access device initiates a network access procedure to the access point; where the specific network access device is a network access device which receives the broadcast frame and has the feature indicated by the feature information.

In still another aspect, an embodiment of the present invention also provides a network access device, including:

an obtaining module, configured to receive a broadcast frame broadcast by an access point, where the broadcast frame includes feature information of the network access device; and the feature information is used for indicating a feature of the network access device;

a determining module, configured to determine whether the terminal device has the feature indicated by the feature information; and an accessing module, configured to initiate a network access procedure to the access point, when a determination result of the determining module is yes.

In yet another aspect, an embodiment of the present invention also provides a wireless fidelity network system, including: an access point, configured to generate and broadcast a broadcast frame; where the broadcast frame includes feature information of a network access device; and the feature information is used for indicating a feature of the network access device; and one or more network access devices, configured to receive the broadcast frame broadcast by the access point; determine whether the network access device has the feature indicated by the feature information, and initiate a network access procedure to the access point if the network access device has the feature indicated by the feature information.

In implementation of the embodiments of the present invention, potential network access devices are differentiated by setting feature information of the network access devices, so that only a device which has a feature indicated by the feature information can access a network correspondingly, thereby greatly reducing the number of devices which request to access an access point at the same moment, and further reducing contention collisions.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments in the present invention without any creative effort, and the application in other fields for the technology disclosed in the present invention shall all fall within the protection scope of the present invention.

In the embodiments of the present invention, STAs are differentiated by setting feature information (for example, the feature information indicates a feature of identity information of a network access device) and the like, so that only the network access device which has the feature indicated by the feature information may access a network. In this way, by sending different pieces of feature information during different time segments, it can be implemented that network access devices may access the network in batches during the different time segments, and the number of devices which contend for network access at the same moment is greatly reduced, so as to reduce a collision possibility and increases network access efficiency. During determination of the feature information, multiple pieces of feature information in the specific embodiments of the present invention may implement full coverage of access devices, for example, it may be set that the MAC address of each STA conforms to a feature indicated by a certain piece of feature information, so as to ensure that all STAs have an opportunity to access the network.

Figure 1:
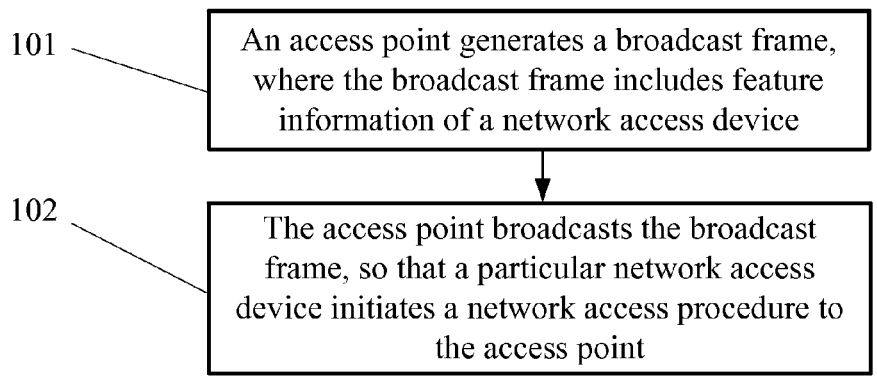
FIG. 1 is a schematic diagram of a specific process of a method for a device to access a network in an embodiment of the present invention.

FIG. 1 shows a method for a device to access a network in an embodiment of the present invention, and the method may be used in a wireless fidelity network system or other similar wireless network systems. The method includes the following steps.

101: An access point generates a broadcast frame, where the broadcast frame includes feature information of a network access device; and the feature information is used for indicating a feature of the network access device. Specifically, in an embodiment of the present invention, the broadcast frame may be a beacon frame.

When determining the feature information, the access point may group potential network access devices into groups according to unique identities of the devices, and obtain corresponding feature information according to the groups, where each piece of feature information may include identity information of devices in corresponding groups.

That is, the feature information is specifically used for indicating a feature of the identity information of the network access device. For example, in an embodiment of the present invention, an identity of the network access device is a MAC address of the network access device. More specifically, the feature indicated by the feature information is that: a value of one specific bit in the MAC address of the network access device is a value indicated by the feature information, or values of multiple specific bits in the MAC address of the network access device are values indicated by the feature information; or a result value obtained by performing a specific operation on a value of one specific bit in the MAC address of the network access device is a value indicated by the feature information, or result values obtained by performing a specific operation on values of multiple specific bits in the MAC address of the network access device are values indicated by the feature information. The value or values of the specific bit or bits in the MAC address may be generated by the access point according to a certain rule or configured by a system management server.

For example, the identity information of the device is a media access control (Media Access Control, MAC) address of the device. Therefore, all possible MAC addresses may be grouped into groups, and the specific number of the groups and grouping standards may be determined according to practical situations. For example, the MAC addresses are grouped into two groups; in one group, a certain bit of the MAC address is 1, and in the other group, the same bit of the MAC address is not 1. In specific embodiments of the present invention, in order to ensure that all possible MAC addresses are grouped into groups, all possible combinations of the 48-bit MAC addresses are covered in the groups during the grouping process.

Each piece of feature information respectively corresponds to one of the groups which cover all potential network access devices, that is, network access devices which have features indicated by the feature information cover all potential network access devices.

102: The access point broadcasts the broadcast frame, so that a specific network access device initiates a network access procedure to the access point; where the specific network access device is a network access device which receives the broadcast frame and has the feature indicated by the feature information. Further, the feature information is specifically used for indicating the feature of the identity information of the network access device; and the specific network access device is specifically a network access device which receives the broadcast frame and of which identity information has the feature indicated by the feature information.

The feature information is valid within the access time corresponding to the broadcast frame. That is, different pieces of feature information may be valid during different time segments, so during a time segment in which the feature information is valid, only a network access device which conforms to the feature information may initiate a network access procedure.

The access time corresponding to the broadcast frame refers to a period of time after the broadcast frame is sent and before a next broadcast frame is sent.

Therefore, in this step, when the access point broadcasts the broadcast frame, the access point may broadcast, within a certain period of time, M broadcast frames which carry N pieces of feature information, where each of the M broadcast frames carries one of the N pieces of feature information, N is an integer greater than or equal to 1, and M is an integer greater than or equal to N; and sets of the network access devices respectively having the features indicated by the N pieces of feature information constitute a whole set of all network access devices.

That is, when the access point broadcasts the feature information, in order to ensure that all potential network access devices in the groups may access the access point, the access point may cyclically broadcast feature information which covers all the potential network access devices. That is, the access point cyclically broadcasts N pieces of feature information to devices within an access range of the access point.

Therefore, in the cyclical broadcasting from one piece of feature information to another piece of feature information, the access point may switch the broadcast feature information in cycles according to switching conditions, such as one or more types of: a loading situation of the access point, a situation of a currently accessing device, and a switching period.

Figure 2:
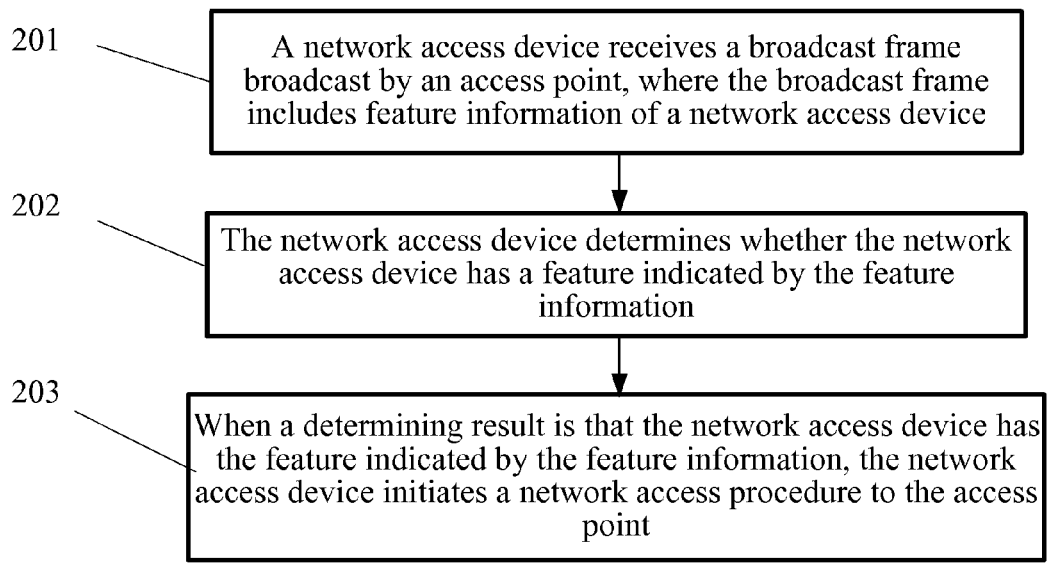
FIG. 2 is a schematic diagram of another specific process of a method for a device to access a network in an embodiment of the present invention.

Correspondingly, an embodiment of the present invention also provides a method for a device to access a network, and the method may be used in a wireless fidelity network system or other similar wireless network systems. As shown in FIG. 2, the method includes the following steps.

201: A network access device receives a broadcast frame broadcast by an access point, where the broadcast frame includes feature information of a network access device; and the feature information is used for indicating a feature of the network access device. Specifically, the broadcast frame may be a beacon frame.

The feature information is valid within the access time corresponding to the broadcast frame. Further, the feature information is specifically used for indicating a feature of identity information of the network access device. For example, an identity of the network access device is a MAC address of the network access device. More specifically, the feature indicated by the feature information is that: a value of one specific bit in the MAC address of the network access device is a value indicated by the feature information, or values of multiple specific bits in the MAC address of the network access device are values indicated by the feature information.

The access time corresponding to the broadcast frame refers to a period of time after the broadcast frame is sent and before a next broadcast frame is sent.

For example, the feature information is feature information corresponding to each group obtained by grouping, where the access point groups potential network access devices into groups according to the identity information of the devices, where each piece of feature information is used for indicating features of identity information of devices in corresponding groups.

202: The network access device determines whether the network access device has the feature indicated by the feature information.

In an embodiment of the present invention, the feature information is specifically used for indicating a feature of identity information of the network access device, so this step is: the network access device determines whether the identity information of the network access device has the feature indicated by the feature information.

In an embodiment of the present invention, the feature indicated by the feature information is that: a value of one specific bit in the MAC address of the network access device is a value indicated by the feature information, or values of multiple specific bits in the MAC address of the network access device are values indicated by the feature information. Therefore, this step is: the network access device determines whether the value of the specific bit in the MAC address of the network access device is the value indicated by the feature information, or the values of the multiple specific bits in the MAC address of the network access device are the values indicated by the feature information.

In an embodiment of the present invention, the feature indicated by the feature information is that: a result value obtained by performing a specific operation on a value of one specific bit in the MAC address of the network access device is a value indicated by the feature information, or result values obtained by performing a specific operation on values of multiple specific bits in the MAC address of the network access device are values indicated by the feature information. Therefore, this step is: the network access device determines whetherafter the specific operation is implemented, the result value of the value of the specific bit in the MAC address of the network access device is the value indicated by the feature information, or the result values of the values of the multiple specific bits in the MAC address of the network access device are the values indicated by the feature information.

The above-mentioned "one specific bit" or "multiple specific bits" may be pre-agreed by the access network and the access devices, or may be specified in the feature information, or may be configured by using other methods. The "specific computation" may also be pre-agreed by the access point and the access devices, or may be carried in the feature information, or may be configured by using other methods.

203: When a determining result is that the network access device has the feature indicated by the feature information, the network access device initiates a network access procedure to the access point. The specific network access procedure may be a network access procedure of the contention access in the prior art, which is not repeated herein.

It may be understood from the foregoing description that this embodiment corresponds to the method embodiment shown in FIG. 1, and the difference lies in the executing subject only. However, both of the embodiments aim at the same process, so the common terms and the like will not be repeated herein.

Figure 3:
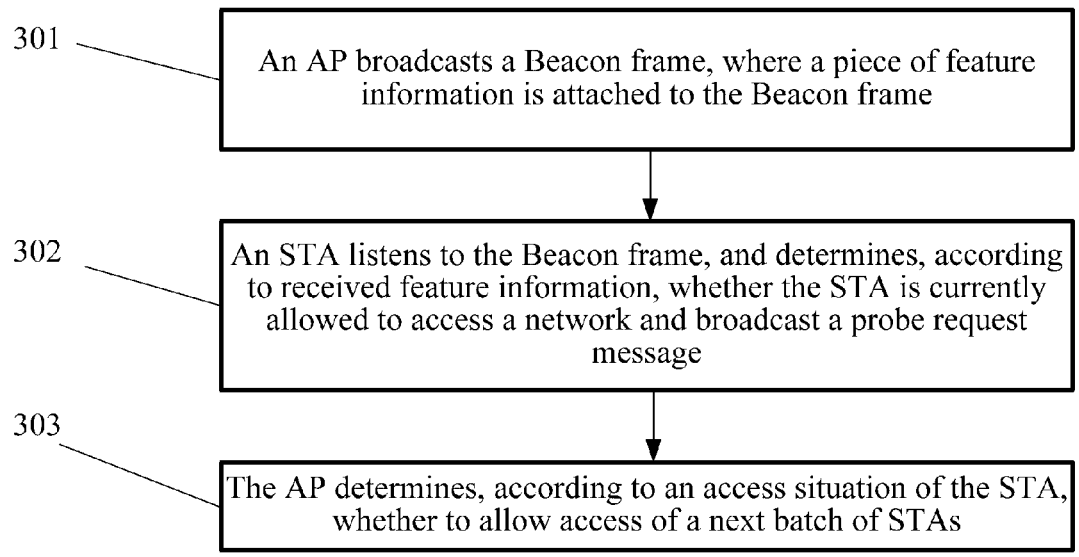
FIG. 3 is a schematic diagram of further another specific process of a method for a device to access a network in an embodiment of the present invention.

In order to further illustrate the above method embodiments, in the following, that an AP broadcasts feature information through a Beacon frame is taken as an example to describe details in the embodiments of the present invention, as shown in FIG. 3.

301: An AP broadcasts a Beacon frame, where a piece of feature information (which may also be called restriction information) is attached to the Beacon frame. The feature information is used for indicating a feature of a network access device, and only the network access device (which is called STATION in 802.11 standards, STA for short) which has the feature indicated by the feature information is allowed to contend for access. In this embodiment, different types of STAs are differentiated according to MAC addresses.

In the prior art, the MAC addresses are fixed 48-bit addresses, which are physical addresses allocated to global devices which can access a network without any repetition. Therefore, the AP does not need to know specific MAC addresses of STAs which may possibly access the AP, and only needs to classify all the MAC addresses.

For example, directly according to numerical features of certain bits in the MAC addresses, for example, the lowest three bits are used, that is, restriction conditions are respectively "000", "001" . . . and "111", altogether eight types are classified, and the feature information indicates the feature of each of the eight types of MAC addresses; or according to a feature of a result obtained after a certain type of digest operation of all the bits of the MAC addresses is implemented, where the number of bits of the result is relatively small, for example, three, all STAs are practically grouped into 8 groups. This method intends to obtain a more even classification result by using information of all bits.

The following takes the scenario that the MAC addresses are classified into four types as an example for illustration.

302: The STA listens to the Beacon frame, and determines, according to received feature information, whether the STA is currently allowed to access a network and broadcast a probe request message.

For example, when the feature indicated by the feature information is that: the lowest two bits of the MAC address is 00, when the STA determines that the lowest two bits of the MAC address thereof is 00, the STA can contend for access, otherwise, the STA continues to listen to the Beacon, and waits for the appearance of a Beacon frame which satisfies a condition of the STA.

303: The AP determines, according to an access situation of the STA, whether to allow access of a next type of STA. If the AP finds that a relatively small number of the STAs which have the feature indicated by the current feature information are accessing the network, so that a channel is relatively idle, the AP allows a next batch of network access devices to access the network, that is, modifying the feature information carried in the Beacon frame, for example, changing the feature indicated by the feature information to that the lowest two bits of MAC addresses are 01, so as to allow network access devices with the lowest two bits of MAC addresses being 01 to access the network. If the AP finds that a relatively large number of the STAs which have the feature indicated by the current feature information are accessing the network, so that the channel is relatively busy, the AP still sets that a next Beacon carries the same feature information. Alternatively, the AP sets certain period of time for each piece of feature information, and when the period of time ends, the AP switches to access of a next type of STAs, no matter whether all the STAs which have the feature indicated by the feature information have been accessed the network.

Definitely, when the AP broadcasts the Beacon frames, the AP may allow access of the same batch of STAs (that is, STAs which have the feature indicated by the same piece of information) in successive Beacon frames, and does not switch to a Beacon frame which allow access of a next batch of STAs until the AP considers, according to a loading situation of the AP and an access situation of the STAs, that it is possible to allow the access of another batch of STAs; and after the access of the last batch of STAs is completed, the cycle begins again from the first batch of STAs.

It may be understood from the description in the above embodiment that, the AP first broadcasts a Beacon message which includes feature information Restriction0, and STAs allowed by the Restriction0 begin to contend for access. The AP has own determination about when to switch to allowing ending of the next batch of STAs. The AP may switch to allowing access of the next batch of STAs in the following case: after a load caused by this batch of STAs reaches a certain threshold, or before the threshold is reached, no STA in this batch accesses the AP (access of this batch is completed), or after a fixed time segment. After the switching, a Beacon includes a next piece of feature information Restriction1, and other pieces of feature information may be deduced by analog. After access of the last batch is completed, the cycle begins again from the first. If the load on the AP caused by all the STAs exceeds a certain threshold, the AP may pause allowing network access of all the STAs.

In this way, through the manner of accessing in batches, the number of STAs which request to access the AP at the same moment can be reduced, so as to reduce contention collisions.

Figure 4:
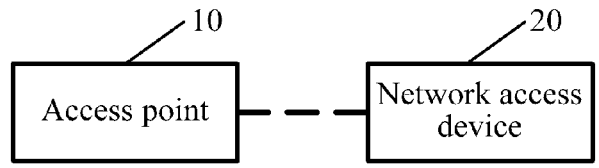
FIG. 4 is a schematic diagram of specific composition of a wireless fidelity network system in an embodiment of the present invention.

As shown in FIG. 4, a wireless fidelity network system in an embodiment of the present invention includes an access point 10 and a network access device 20 described in the embodiments recorded in this specification. The access point 10 is configured to generate and broadcast a broadcast frame; where the broadcast frame includes feature information of a network access device; and the feature information is used for indicating a feature of the network access device. One or more network access devices 20 are configured to receive the broadcast frame broadcast by the access point; determine whether the network access device has the feature indicated by the feature information, and if the network access device has the feature indicated by the feature information, initiate a network access procedure to the access point. FIG. 4 shows only one network access device 20, and in specific embodiments, there may be multiple network access devices, which are not shown in the figure.

Figure 5:
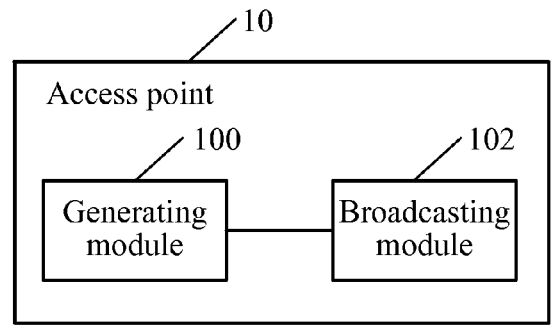
FIG. 5 is a schematic diagram of specific composition of an access point in an embodiment of the present invention.

As shown in FIG. 5, it is a schematic diagram of specific composition of an access point in an embodiment of the present invention. The access point 10 includes: a generating module 100, configured to generate a broadcast frame, where the broadcast frame includes feature information of a network access device; and the feature information is used for indicating a feature of the network access device; and a broadcasting module 102, configured to broadcast the broadcast frame, so that a specific network access device initiates a network access procedure to the access point; where the specific network access device is a network access device which receives the broadcast frame and has the feature indicated by the feature information.

Specifically, the broadcast frame may be a beacon frame. The feature information is specifically used for indicating a feature of identity information of the network access device; and the specific network access device is specifically a network access device which receives the broadcast frame and of which identity information has the feature indicated by the feature information.

Further, an identity of the network access device is a media access control MAC address of the network access device. The feature indicated by the feature information is that: a value of one specific bit in the MAC address of the network access device is a value indicated by the feature information, or values of multiple specific bits in the MAC address of the network access device are values indicated by the feature information; or a result value obtained by performing a specific operation on a value of one specific bit in the MAC address of the network access device is a value indicated by the feature information, or result values obtained by performing a specific operation on values of multiple specific bits in the MAC address of the network access device are values indicated by the feature information.

The broadcasting module 102 is also configured to: within a certain period of time, broadcast M broadcast frames which carry N pieces of feature information, where each of the M broadcast frames carries one of the N pieces of feature information, N is an integer greater than or equal to 1, and M is an integer greater than or equal to N; and sets of the network access devices respectively having the features indicated by the N pieces of feature information constitute a whole set of all network access devices.

Figure 6:
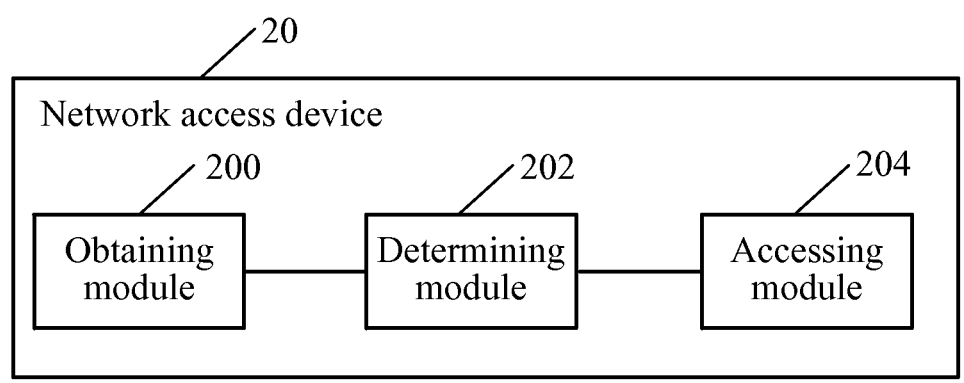
FIG. 6 is a schematic diagram of specific composition of a network access device in an embodiment of the present invention.

FIG. 6 shows a network access device in an embodiment of the present invention. The network access device 20 includes: an obtaining module 200, configured to receive a broadcast frame broadcast by an access point, where the broadcast frame includes feature information of the network access device; and the feature information is used for indicating a feature of the network access device; a determining module 202, configured to determine whether the terminal device has the feature indicated by the feature information; and an accessing module 204, configured to initiate a network access procedure to the access point, when a determination result of the determining module is yes.

The broadcast frame may be a beacon frame. The feature information is specifically used for indicating a feature of identity information of the network access device; the determining module is specifically configured to determine whether identity information of the network access device has the feature indicated by the feature information.

Further, an identity of the network access device may be a media access control MAC address of the network access device.

The feature indicated by the feature information may be that: a value of one specific bit in the MAC address of the network access device is a value indicated by the feature information, or values of multiple specific bits in the MAC address of the network access device are values indicated by the feature information; so the determining module 202 is specifically configured to determine whether the value of the specific bit in the MAC address of the network access device is the value indicated by the feature information, or the values of the multiple specific bits in the MAC address of the network access device are the values indicated by the feature information; or the feature indicated by the feature information is that: a result value obtained by performing a specific operation on a value of one specific bit in the MAC address of the network access device is a value indicated by the feature information, or result values obtained by performing a specific operation on values of multiple specific bits in the MAC address of the network access device are values indicated by the feature information; so the determining module 202 is specifically configured to determine whether after the specific operation is implemented, the result value of the value of the specific bit in the MAC address of the network access device is the value indicated by the feature information, or the result values of the values of the multiple specific bits in the MAC address of the network access device are the values indicated by the feature information.

The related terms and details in the above apparatus embodiment are consistent with those in the foregoing method embodiments, which are not repeated herein.

As can be seen from the description of above embodiments, in the embodiments of the present invention, potential network access devices are differentiated by setting feature information of the network access devices, so that only a network access device which has a feature indicated by the feature information can access a network correspondingly, thereby greatly reducing the number of devices which request to access an access point at the same moment, and further reducing contention collisions.

A person of ordinary skill in the art may understand that all or a part of processes of the methods in the embodiments may be implemented by a computer program instructing relevant hardware. The program may be stored in a computer readable storage medium. When the program runs, the processes of the methods in the embodiments are performed. The storage medium may be a magnetic disk, an optical disk, a read-only memory (Read-Only Memory, ROM), or a random access memory (Random Access Memory, RAM).

Disclosed above is only preferred embodiments of the present invention, which are certainly not intended to limit the protection scope of the present invention, so any equivalent variation made according to claims of the present invention still falls within the scope of the present invention.

What is claimed is:

1. A method for a device to access a Wireless Fidelity (Wi-Fi) network comprising:
    generating, by an access point in the Wi-Fi network, a broadcast frame including information that specifying an X number of bits of a media access control (MAC) address and specifying values of the X number of bits of the MAC address, wherein the information is capable of being used by a network access device receiving the broadcast frame to determine whether values of the network address device's MAC address match the values of the X number of bits; and
    broadcasting, by the access point, the broadcast frame, to enable a targeted network access device to initiate a network access procedure with the access point, wherein the targeted network access device is a network access device which receives the broadcast frame and values of the X number of bits of the MAC address of the targeted network access device match those specified in the broadcast frame, and the network access procedure is initiated before the target network access device is associated with the access point;
    wherein X is an integer equal to or greater than 1 and X is smaller than a number of the bits of the MAC address.

2. The method according to claim 1, wherein the feature information is valid within an access duration corresponding to the broadcast frame.

3. The method according to claim 1, wherein the broadcasting, by the access point, the broadcast frame comprises:
    within a certain period of time, broadcasting, by the access point, M broadcast frames which include N pieces of information, wherein each of the M broadcast frames includes one of the N pieces of information, N is an integer greater than or equal to 1, and M is an integer greater than or equal to N; and wherein sets of network access devices having a feature indicated by one of the N pieces of information constitute a whole set of all network access devices.

4. A method for a device to access a Wireless Fidelity (Wi-Fi) network comprising:
    receiving, by a first network access device, a broadcast frame broadcast from an access point in the Wi-Fi network, wherein the broadcast frame comprises feature information of a network access device, and the feature information specifies an X number of bits of a media access control (MAC) address of the network access device, and specifies values of the X number of bits;
    determining, by the first network access device, whether values of the X number of bits of a MAC address of the first network access device are the same values specified by the feature information; and
    initiating, by the first network access device, a network access procedure with the access point when the first network access device determines that values of the X bits of the MAC address of the first network access devices are the same values specified by the feature information;
    wherein the network access procedure is initiated before the first network access device is associated with the access point, X is an integer equal to or greater than 1 and X is smaller a number of the bits of the MAC address.

5. The method according to claim 4, wherein the feature information is valid within an access duration corresponding to the broadcast frame.

6. An access point in a Wireless Fidelity (Wi-Fi) network comprising:
    a processor configured to generate a broadcast frame, wherein the broadcast frame including information specifying an X number of bits of a media access control (MAC) address, and specifying values of the X number of bits; and
    a transmitter configured to broadcast the broadcast frame for enabling a targeted network access device receiving the broadcast frame to initiate a network access procedure with the access point, wherein the targeted network access device is a network access device that receives the broadcast frame and values of the X number of bits of the targeted network access device's MAC address that match the values specified by the information;
    wherein the network access procedure is initiated before the specific network access device is associated with the access point, X is an integer equal to or greater than 1 and X is smaller than Y, and Y is the number of the bits of the MAC address.

7. The access point according to claim 6, wherein
    the transmitter is configured to: within a certain period of time, broadcast M broadcast frames which include N pieces of information, wherein each of the M broadcast frames includes one of the N pieces of information, N is an integer greater than or equal to 1, and M is an integer greater than or equal to N; and wherein sets of network access devices separately having a feature indicated by the N pieces of information constitute a whole set of all network access devices.

8. A network access device comprising:
- a receiver, configured to receive a broadcast frame broadcast by an access point in a Wireless Fidelity (Wi-Fi) network, wherein the broadcast frame comprises feature information about a targeted network access device, and the information specifies X bits of a media access control (MAC) address of the targeted network access device, and specifies values of the X bits;
- a processor, configured to determine whether the network access device has information matching the information comprising the broadcast frame; and
- a transmitter, configured to initiate a network access procedure with the access point before associating the network access device with the access point, when the processor determines that values of the X bits of a MAC address of the network access device match the values specified by the feature information;
- wherein X is an integer equal to or greater than 1 and X is smaller than a number of the bits of the MAC address.

9. The method according to claim 1, wherein the network access procedure is compliant with an IEEE 802.11 standard.

10. The method according to claim 4, wherein the network access procedure is compliant with an IEEE 802.11 standard.

11. The access point according to claim 6, wherein the network access procedure is compliant with an IEEE 802.11 standard.

12. The network access device according to claim 8, wherein the feature information is valid within an access duration corresponding to the broadcast frame.

* * * * *